United States Patent Office 3,477,960
Patented Nov. 11, 1969

3,477,960
PREPARATION OF LITHIUM-MANGANESE
FERRITE
Donald G. Wickham, Malibu, Calif., assignor to Ampex Corporation, Redwood City, Calif., a corporation of California
No Drawing. Filed Aug. 23, 1967, Ser. No. 662,569
Int. Cl. C04b 35/36, 35/64; H01f 1/22
U.S. Cl. 252—62.6                    4 Claims

ABSTRACT OF THE DISCLOSURE

In the manufacture of lithium-manganese ferrites, the compound $Li_2MnO_3$ is employed as the source of lithium and manganese and the starting materials are ground together in an aqueous medium.

Background of the invention

Manufacture of lithium manganese ferrites.

Description of the prior art

In the past, lithium containing ferrites could not be prepared from a mixture which is ground in an aqueous medium since lithium carbonate, the usual source of lithium, is soluble in water. It was therefore necessary to employ a nonaqueous fluid such as ethyl or isopropyl alcohol which increases the cost of preparation and also which presents a fire hazard.

Summary of the invention

Preparation of lithium-manganese ferrites wherein $Li_2MnO_3$ is used as a source of lithium and manganese and water is used as the grinding medium.

Description of the preferred embodiments

Many of the most useful and interesting ferrite materials are substituted lithium ferrites which can be described by the general chemical formula,

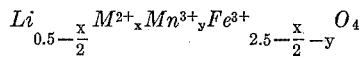

wherein the subscript $x$ is from zero to less than 1.0; $y$ satisfies the relationship $$\frac{1-x}{2y} \leq 2.0$$

and M is a divalent metal which can be cobalt, nickel, copper or magnesium. For example, the ferrite with the chemical formula $$Li_{0.45}Ni_{0.10}Mn_{0.30}Fe_{2.15}O_4$$

($M^{2+}$ is $Ni^{2+}$, $x=0.1$, and $y=0.3$) when properly prepared in the form of a toroid of suitable dimensions exhibits the rectangular magnetic hysteresis loop and other electrical and magnetic characeristics necessary for application as a bistable magnetic memory device or memory core. The starting materials for the preparation include nickel oxide, manganese oxide, iron oxide and lithium carbonate, the latter substance being the only commonly available source of lithium that can be used. Nickel, manganese and iron oxides are very inert substances at low temperatures. In order to bring about the reactions leading to the formation of the ferrite the starting material must be very finely divided and mixed together as intimately as possible. For this purpose they are usually ground together in a ball mill. The grinding and mixing are done most efficiently if sufficient liquid is present to make a thin slurry with the starting materials. Water, which is usually employed as the grinding liquid cannot be used with lithium carbonate because the carbonate is soluble in it and will be separated from the other reactants when the water is removed. A nonaqueous fluid such as pure ethyl or isopropyl alcohol is frequently used. However, when lithium ferrites are prepared on a large scale the cost of the alcohol becomes important. Furthermore, large quantities of alcohol or other flammable liquids which could be used often present a dangerous fire hazard. The procedure described below has been worked out so that only water is required as a grinding fluid and thus these two disadvantages of older procedures are avoided.

One of the very few known water-insoluble lithium compounds is the compound with the chemical formula $Li_2MnO_3$ which is called lithium manganite or lithium manganate (IV). (The IV denotes the oxidation state of the manganese.) The preparation of lithium manganite is described by Ellestad et al. in the U.S. Patent 2,562,705. The inventor has found that in water the solubility of $Li_2MnO_3$ in water is small enough to make $Li_2MnO_3$ a useful starting material for the preparation of lithium manganese ferrites. It can be used for any composition which has an atomic ratio Li/Mn less than 2.0, such as the one mentioned above or in the general formula given, compositions with

The solubility of lithium manganite in pure water is extremely small. The manganite, however is slightly decomposed by water (hydrolysis) under the grinding action of the ball mill which continuously produces fresh, relatively reactive surfaces. Approximately 2% of the lithium in finely divded $Li_2MnO_3$ will go into solution. It was discovered that the hydrolysis can be suppressed by adding 0.5 percent by weight of ammonium acetate to the water in the mill. Less than 1% of the lithium then goes into solution.

The following non-limiting examples illustrate preferred embodiments of the invention.

Example 1

The preparation of the ferrite $Li_{0.45}Ni_{0.10}Mn_{0.30}Fe_{2.2}O_{4.0}$ is carried out in the following way.

One gram-formula weight is prepared from the following quantities of materials.

0.2250 g.—formula weights of $Li_2MnO_3$ or 26.28 g.
0.0375 g.—formula weights of $Mn_2O_3$ or 5.92 g.
0.1000 g.—formula weights of NiO or 7.57 g.
1.0750 g.—formula weights of $Fe_2O_3$ or 171.68 g.

The lithium manganite and the other oxides are weighed into a mill jar containing a number of stainless-steel balls. A rubber-lined jar of 1.4 liters capacity containing 2700 g. of ⅜ in. diam. balls is used. 650 ml. of water containing 3.25 g. of ammonium acetate is added to produce a thin slurry. The jar is rolled on a jar-roller for 24 hours. The slurry is then dried and sieved. The ammonium acetate evaporates when the slurry is dried. The intimately mixed starting materials are reacted by heating the mixture at a temperature of approximately 1650° F. for 4 hours. The reacted material is ground again in water the same way as before and the slurry dried. The residue is a completely reacted ferrite. It can be combined with binders and lubricants to prepare it for pressing into the form of toroids or treated in other ways as is well known to those skilled in the art as required by the fabrication intended. The preparation of a device is completed by firing the pieces to a high temperature.

The identity and character of the product ferrite prepared according to this example have been established by X-ray diffraction and chemical analysis.

The final test of the utility of the procedure is found in the magnetic characteristics of the devices produced. Memory cores of the same composition to the one given above were prepared by both procedures, (1) using lithium carbonate as a starting material and isopropyl alcohol as a grinding fluid; (2) using lithium manganite, $Li_2MnO_3$, as a starting material and water as a grinding fluid. The cores were tested by a standard $dV_1$ test program (standard in the industry) with the results given below for 25° C.

|  | Grinding liquid | $I_w/I_{pw}$ (ma.) | $dV_1$ (mv.) | $dV_z$ (mv.) | $t_p$ ($\mu s$.) | $t_s$ ($\mu s$.) |
|---|---|---|---|---|---|---|
| Source of Li: |  |  |  |  |  |  |
| $Li_2CO_3$ | Isopropyl | 720/465 | 38 | 12 | 0.13 | 0.25 |
| $Li_2MnO_3$ | Water | 720/465 | 39 | 11 | 0.12 | 0.23 | with $t_r$=0.05 microsecond, $t_d$=0.3 microsecond.
$I_w$=full write current (milliamperes).
$I_{pw}$=partial write current (milliamperes).
$dV_1$=disturbed voltage one (millivolts).
$dV_z$=disturbed voltage zero (millivolts).
$t_p$=peak time of $dV_1$ (microseconds).
$t_s$=switching time of $dV_1$ (microseconds).
$t_r$=rise of time of $I_w$ pulse (microseconds).
$t_d$=duration time of $I_w$ pulse (microseconds).

It is apparent from the above that the results of the two procedures are almost the same. The new process, described herein, yields a slightly improved device with a larger $dV_1$ and a smaller $t_s$. It is, therefore, a significant improvement in that a product equal or superior to the older one is prepared by a cheaper, safer method.

Example 2

The formula

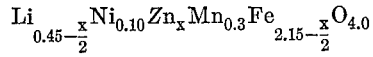

describes a family of compositions which yield useful magnetic memory cores. The magnetic properties can be varied by varying the concentration of zinc.

(a) $x$=0.05; $Li_{0.425}Ni_{0.10}Zn_{0.05}Mn_{0.30}Fe_{2.125}O_4$. This composition can be prepared by combining 0.2125 gram-molecular weights of $Li_2MnO_3$, 0.1 of NiO, 0.05 of ZnO, 0.04375 of $Mn_2O_3$ and 1.0625 of $Fe_2O_3$. The mixing and grinding is carried out in water in the manner described in Example 1. Toroids with the approximate dimensions O.D., 0.22 in.; I.D., 0.0135 in., height, 0.0055 in. were prepared and when tested according to a standard test program exhibit properties which permit their use as magnetic memory elements.

| | |
|---|---|
| $I_w/I_{pw}$ (ma.) | 765/470 |
| $dV_1$ (mv.) | 47.5 |
| $dV_z$ (mv.) | 11.1 |
| $t_p$ ($\mu s$.) | 0.12 |
| $t_s$ ($\mu s$.) | 0.26 |

(b) $x$=0.10; $Li_{0.40}Ni_{0.10}Zn_{0.10}Mn_{0.30}Fe_{2.10}O_4$. This composition is prepared by combining 0.20 gram-molecular weights of $Li_2MnO_3$, 0.10 of NiO, 0.10 of ZnO, 0.05 of $Mn_2O_3$ and 1.05 of $Fe_2O_3$. The mixing and grinding again can be carried out in water and the material reacted and processed as described above. Typical properties of memory cores prepared from this material are the following:

| | |
|---|---|
| $I_w/I_{pw}$ (ma.) | 765/470 |
| $dV_1$ (mv.) | 52 |
| $dV_z$ (mv.) | 11 |
| $t_p$ ($\mu s$.) | 0.12 |
| $t_s$ ($\mu s$.) | 0.22 |

Example 3

The formula $Li_{0.50}Mn_{0.30}Fe_{2.20}O_{4.0}$ describes a ferrite which has applications as a magnetic switching element stable over wide ranges of temperature. It is prepared by the process herein described using $Li_2MnO_3$ as a starting material and water as a grinding fluid. The quantities 0.25 gram-molecular weights of $Li_2MnO_3$, 0.025 of $Mn_2O_3$ and 1.10 of $Fe_2O_3$ are mixed together and processed in the manner described above. Toroids of dimensions noted above have the following properties:

| | |
|---|---|
| $I_w/I_{pw}$ | 800/400 |
| $dV_1$ | 44 |
| $dV_z$ | 9.0 |
| $t_p$ | 0.11 |
| $t_s$ | 0.22 |

Example 4

The general formula for compositions that can be prepared using $Li_2MnO_3$ as a starting material and water as a grinding liquid is $$Li_{0.5-\frac{x}{2}}M^{2+}{}_xMn^{3+}{}_{2.5-\frac{x}{2}-y}Fe...O_4$$

wherein the subscript $x$ is from zero to less than 1.0; satisfies the relationship $$\frac{1-x}{2\ y.} \leq 2.0$$

and M is a divalent metal which can be cobalt, nickel, copper, magnesium, zinc or cadmium. The table below lists the molar quantities required to prepared one gram-molecular weight of several typical compositions and illustrates the general usefulness of the process described.

| | x | y | 1−x/2y | $Li_2MnO_3$ | MO[1] | $Mn_2O_3$ | $Fe_2O$ |
|---|---|---|---|---|---|---|---|
| (1) | 0 | 0.25 | 2.0 | 0.25 | 0 | 0 | 1.125 |
| (2) | 0 | 0.50 | 1.0 | 0.25 | 0 | 0.125 | 1.0001 |
| (3) | 0.2 | 0.2 | 2.0 | 0.20 | 0.20 | 0 | 1.100 |
| (4) | 0.8 | 0.05 | 2.0 | 0.05 | 0.80 | 0 | 1.025 |
| (5) | 0.98 | 0.005 | 2.0 | 0.005 | 0.98 | 0 | 1.0025 |
| (6) | 0.98 | 0.200 | 0.05 | 0.005 | 0.98 | 0.0975 | 0.905 |
| (7) | 0.98 | 0.400 | 0.025 | 0.005 | 0.98 | 0.1975 | 0.805 |

[1] The oxide of a divalent metal MO can be MnO, CoO, NiO, CuO, MgO, ZnO, or CdO or a combination of them. These are the divalent metals commonly present in the ferrites.

The procedure can be varied widely while satisfactory results are achieved. It is necessary that the lithium manganite be well mixed with the other starting materials and that the reaction temperature be high enough and the soak period long enough to substantially complete the reactions required for the formation of the ferrite.

I claim:

1. In the process of making ferrites containing lithium, manganese and iron wherein compounds of these materials are ground together in a liquid medium and fired at an elevated temperature, the improvement comprising employing $Li_2MnO_3$ as the source of lithium and manganese and conducting the grinding in an aqueous medium.

2. The process of claim 1 wherein the aqueous medium contains about 0.5 weight percent of ammonium acetate.

3. The process of claim 1 wherein the ferrite has the composition:

$$Li_{0.5-\frac{x}{2}}M^{2+}_xMn^{3+}_yFe^{3+}_{2.5-\frac{x}{2}-y}O_{4.0}$$

wherein the subscript $x$ is from zero to less than 1.0; $y$ satisfies the relationship $$\frac{1-x}{2y} \leq 2.0$$

and M is a divalent metal which can be cobalt, nickel, copper, magnesium, zinc, or cadmium.

4. The process of claim 1 wherein the ferrite has the composition:

$$Li_{0.5-\frac{x}{2}}Ni_{0.10}Zn_xMn_{0.3}Fe_{2.15-\frac{x}{2}}O_{4.0}$$

References Cited

UNITED STATES PATENTS 3,372,123   3/1968   Esveldt et al. _____ 252—62.61

TOBIAS E. LEVOW, Primary Examiner

R. D. EDMONDS, Assistant Examiner

U.S. Cl. X.R.

252—62.61, 62.62, 62.64